US012783392B2

(12) United States Patent
Mihailescu et al.

(10) Patent No.: US 12,783,392 B2
(45) Date of Patent: Nov. 3, 2026

(54) METHODS, SYSTEMS, AND COMPUTER READABLE MEDIA FOR EMULATING A DISTRIBUTED COMPUTING SCENARIO USING A GRAPH-BASED REPRESENTATION OF ARTIFICIAL INTELLIGENCE/MACHINE LEARNING WORKLOAD EXECUTION WITH AN EXPANDED COLLECTIVE COMMUNICATION OPERATION

(71) Applicant: Keysight Technologies, Inc., Santa Rosa, CA (US)

(72) Inventors: Dan Mihailescu, Mogosoaia (RO); Andrey John Balogh, Bothell, WA (US); Winston Wencheng Liu, Woodland Hills, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 249 days.

(21) Appl. No.: 18/640,624

(22) Filed: Apr. 19, 2024

(65) Prior Publication Data

US 2025/0328453 A1 Oct. 23, 2025

(30) Foreign Application Priority Data

Apr. 15, 2024 (RO) .............................. a 2024 00183

(51) Int. Cl.
*G06F 11/3668* (2025.01)
*G06F 11/34* (2006.01)

(52) U.S. Cl.
CPC ...... *G06F 11/3688* (2013.01); *G06F 11/3433* (2013.01); *G06F 11/3684* (2013.01)

(58) Field of Classification Search
None
See application file for complete search history.

(56) References Cited

U.S. PATENT DOCUMENTS

2003/0074649 A1* 4/2003 Poulsen .................... G06F 8/51 717/114
2006/0101369 A1* 5/2006 Wang ...................... G06F 30/30 712/E9.028

(Continued)

OTHER PUBLICATIONS

Rashidi, et al., "ASTRA-Sim: Enabling SW/HW Co-Design Exploration for Distributed DL Training Platforms", IEEE International Symposium on Performance Analysis of Systems and Software (ISPASS), pp. 1-12 (2020).

(Continued)

*Primary Examiner* — Philip Wang
*Assistant Examiner* — Rongfa P Wang

(57) ABSTRACT

A method for emulating a distributed computing scenario using a graph-based representation of AI/ML workload execution with an expanded collective communication operation includes receiving a graph-based representation of AI/ML workload execution comprising a collective communication node and expanding the collective communication node by replacing a collective communication operation of the collective communication node with low-level processing instructions. A modified graph-based representation of AI/ML workload execution comprising the low-level processing instructions is generated. The modified graph-based representation of AI/ML workload execution is implemented in an emulated test case using an emulation engine.

16 Claims, 16 Drawing Sheets

(56) References Cited

U.S. PATENT DOCUMENTS

| | | | | |
|---|---|---|---|---|
| 2018/0249406 | A1* | 8/2018 | Tellado | H04L 47/2491 |
| 2022/0345535 | A1* | 10/2022 | Enrici | G06F 16/9027 |
| 2023/0289310 | A1* | 9/2023 | Grohoski | G06F 13/4027 |
| 2023/0325312 | A1* | 10/2023 | Koeplinger | G06F 8/45 711/118 |
| 2023/0351145 | A1* | 11/2023 | Wang | G06N 3/063 |
| 2023/0385077 | A1* | 11/2023 | Wang | G06F 7/5443 |
| 2024/0118920 | A1* | 4/2024 | Wang | G06F 9/4881 |
| 2025/0328453 | A1* | 10/2025 | Mihailescu | G06F 11/3698 |

OTHER PUBLICATIONS

Hsia, et al., "MAD Max Beyond Single-Node: Enabling Large Machine Learning Model Acceleration on Distributed Systems", FAIR, Meta, Harvard University, pp. 1-15 (2023).

Bang, et al., "vTrain: A Simulation Framework for Evaluating Cost-effective and Compute-optimal Large Language Model Training", Samsung Advanced Institute of Technology, pp. 1-14 (2023).

Won, et al., "ASTRA-sim2.0: Modeling Hierarchical Networks and Disaggregated Systems for Large-model Training at Scale", IEEE International Symposium on Performance Analysis of Systems and Software (ISPASS), pp. 1-12 (2023).

Sridharan, et al., "Chakra: Advancing Performance Benchmarking and Co-design using Standardized Execution Traces", Georgia Institute of Technology, pp. 1-9 (2023).

Feng, et al., "Using Chakra execution traces for benchmarking and network performance optimization", Engineering at Meta (Sep. 2023).

* cited by examiner

800

```
1708803250s Initialized dfe plugin
1708803250s Running trial...
1708803250s Copying .nucleon-kube-config from shrinkray-server-2.lbj.is.keysight.com
1708803250s Connected (version 2.0, client OpenSSH_8.9p1)
1708803250s Authentication (publickey) successful!
1708803250s Expanding node:2 name:reducescatter-1 type:COMM_COLL_NODE comm_type:REDUCE_SCATT
1708803250s Adding 4 hosts to DFEConfig
1708803250s Adding 9 workload nodes to host 32.0.3.1
1708803250s Adding 9 workload nodes to host 32.0.1.1
1708803250s Adding 9 workload nodes to host 32.0.2.1
1708803250s Adding 9 workload nodes to host 32.0.4.1
1708803250s Nucleon started.
1708803250s Found kubernetes configuration: https://shrinkray-server-2.lbj.is.keysight.com:4
1708803251s Connected (version 2.0, client OpenSSH_8.9p1)
1708803252s Authentication (publickey) successful!
1708803252s Redis Server: Redis<ConnectionPool<Connection<host=127.0.0.1,port=6379,db=0,clie
1708803254s Sending configurations to hosts.
1708803255s Start configuring flows ...
1708803259s All flows are configured and ready for execution ...
1708803259s Starting-traffic execution ...
1708803261s
                                                seconds  start_time_us  end_tim
1708803261s Stop agents ...
1708803263s Done.
1708803263s Job Completion Time(us):269006
```

FIG. 8A

840

| | seconds | start_time_us | end_time_us | bytes_tx | bytes_rx | packets_tx | packets_rx | bps_tx |
|---|---|---|---|---|---|---|---|---|
| flow/flow-1--32.0.4.1--32.0.1.1/dst/host/0/1 | 0.26819 | 1000027 | 1268217 | 0 | 999948288 | 0 | 7629 | 0 |
| flow/flow-1--32.0.4.1--32.0.1.1/src/host/3/1 | 0.08716 | 1177037 | 1264197 | 999948288 | 0 | 7629 | 0 | 91780476181 |
| flow/flow-10--32.0.3.1--32.0.4.1/src/host/2/1 | 0.090723 | 1000027 | 1090750 | 999948288 | 0 | 7629 | 0 | 88175945504 |
| flow/flow-10--32.0.3.1--32.0.4.1/dst/host/3/1 | 0.090717 | 1000032 | 1090749 | 0 | 999948288 | 0 | 7629 | 0 |
| flow/flow-11--32.0.3.1--32.0.4.1/dst/host/3/1 | 0.176793 | 1000027 | 1176820 | 0 | 999948288 | 0 | 7629 | 0 |
| flow/flow-11--32.0.3.1--32.0.4.1/src/host/2/1 | 0.093432 | 1083396 | 1176828 | 999948288 | 0 | 7629 | 0 | 85619341381 |

FIG. 8C

METHODS, SYSTEMS, AND COMPUTER READABLE MEDIA FOR EMULATING A DISTRIBUTED COMPUTING SCENARIO USING A GRAPH-BASED REPRESENTATION OF ARTIFICIAL INTELLIGENCE/MACHINE LEARNING WORKLOAD EXECUTION WITH AN EXPANDED COLLECTIVE COMMUNICATION OPERATION

PRIORITY CLAIM

This application claims the priority benefit of Romanian Patent Application No. a 2024 00183, filed Apr. 15, 2024, and entitled, "METHODS, SYSTEMS, AND COMPUTER READABLE MEDIA FOR EMULATING A DISTRIBUTED COMPUTING SCENARIO USING A GRAPH-BASED REPRESENTATION OF ARTIFICIAL INTELLIGENCE/MACHINE LEARNING WORKLOAD EXECUTION WITH AN EXPANDED COLLECTIVE COMMUNICATION OPERATION", the disclosure of which is incorporated herein by reference in its entirety.

TECHNICAL FIELD

The subject matter described herein relates to graph-based representation of artificial intelligence/machine learning (AI/ML) workload execution. More specifically, the subject matter relates to methods, systems, and computer readable media for emulating a distributed computing scenario using a graph-based representation of AI/ML workload execution with an expanded collective communication operation.

BACKGROUND

In the context of AI/ML workload processing, an execution graph, also known as a computation graph or computational graph, is a visual representation of the computational flow of operations that a model performs during training or inference via distributed computing systems. It is a directed acyclic graph (DAG) where nodes represent operations, and edges represent the flow of data between these operations. Deep learning systems utilize distributed training over hardware platforms based on neural processing units (NPUs), such as graphics processing units (GPUs) and/or application-specific integrated circuits (ASICs) like tensor processing units (TPUs).

Execution graphs are particularly relevant in deep learning frameworks where models are defined using symbolic computation. These graphs capture the dependencies between different operations, allowing for efficient automatic differentiation and optimization during training. The graph is a blueprint of the computation, and it facilitates various optimizations, including parallelization and memory efficiency.

Chakra's approach provides an open, interoperable graph-based depiction of AI/ML workload execution. The Chakra execution trace captures core operations—including compute, memory, and communication—along with their dependencies, timing, and metadata. Though execution traces are a valuable representation of an ML task, the structure and metadata of the resulting traces can differ based on the ML framework utilized. Recognizing this, Chakra introduces a standardized schema for performance modeling, termed the Chakra execution trace. However, the Chakra execution trace shows only high-level collective communication operations. There is a need to expand the collective communication operations to low-level processing instructions that allow a user to test alterations to the low-level processing.

SUMMARY

Methods, systems, and computer readable media for emulating a distributed computing scenario using a graph-based representation of AI/ML workload execution with an expanded collective communication operation are disclosed. An example method for emulating a distributed computing scenario using a graph-based representation of artificial intelligence/machine learning (AI/ML) workload execution with an expanded collective communication operation includes receiving, at a test platform, a graph-based representation of AI/ML workload execution comprising a collective communication node. The method further includes expanding, by the test platform, the collective communication node by replacing a collective communication operation of the collective communication node with low-level processing instructions. The method further includes generating, by the test platform, a modified graph-based representation of AI/ML workload execution comprising the low-level processing instructions. The method further includes implementing, by the test platform, the modified graph-based representation of AI/ML workload execution in an emulated test case using an emulation engine.

According to another aspect of the method described herein, the low-level processing instructions comprise send and receive primitives.

According to another aspect of the method described herein, expanding the collective communication node comprises replacing the collective communication node with send and receive nodes.

According to another aspect of the subject matter described herein, the method further includes displaying a representation of the expanded collective communication node for a single rank.

According to another aspect of the subject matter described herein, the method further includes defining a collective communication algorithm based on the low-level processing instructions, wherein the emulated test case uses the collective communication algorithm.

According to another aspect of the subject matter described herein, the method further includes reporting at least one performance metric from the executed emulated test case.

According to another aspect of the method described herein, the low-level processing instructions are based on the collective communication operation.

According to another aspect of the subject matter described herein, the method further includes revising the low-level processing instructions to define a revised collective communication algorithm.

According to another aspect of the subject matter described herein, the method further includes comparing performance metrics from a first executed emulated test case using the low-level processing instructions based on the collective communication operation and from a second executed emulated test case using the revised collective low-level processing instructions.

An example system for emulating a distributed computing scenario using a graph-based representation of artificial intelligence/machine learning (AI/ML) workload execution with an expanded collective communication operation includes a test platform including at least one processor and a memory, the test platform implemented by the at least one processor for receiving a graph-based representation of AI/ML workload execution comprising a collective communication node. The test platform is further implemented for expanding the collective communication node by replacing a collective communication operation of the collective communication node with low-level processing instructions. The test platform is further implemented for generating a modified graph-based representation of AI/ML workload execution comprising the low-level processing instructions. The test platform is further implemented for implementing the modified graph-based representation of AI/ML workload execution in an emulated test case using an emulation engine.

According to another aspect of the system described herein, the low-level processing instructions comprise send and receive primitives.

According to another aspect of the system described herein, expanding the collective communication node comprises replacing the collective communication node with send and receive nodes.

According to another aspect of the system described herein, the test platform is configured for displaying a representation of the expanded collective communication node for a single rank.

According to another aspect of the system described herein, the test platform is configured for defining a collective communication algorithm based on the low-level processing instructions, wherein the emulated test case uses the collective communication algorithm.

According to another aspect of the system described herein, the test platform is configured for reporting at least one performance metric from the executed emulated test case.

According to another aspect of the system described herein, the low-level processing instructions are based on the collective communication operation.

According to another aspect of the system described herein, the test platform is configured for revising the low-level processing instructions to define a revised collective communication algorithm.

According to another aspect of the system described herein, the test platform is configured for comparing performance metrics from a first executed emulated test case using the low-level processing instructions based on the collective communication operation and from a second executed emulated test case using the revised collective low-level processing instructions.

An example non-transitory computer readable medium has stored thereon executable instructions that when executed by at least one processor of at least one computer cause the at least one computer to perform steps comprising receiving a graph-based representation of AI/ML workload execution comprising a collective communication node. The steps further include expanding the collective communication node by replacing a collective communication operation of the collective communication node with low-level processing instructions. The steps further include generating a modified graph-based representation of AI/ML workload execution comprising the low-level processing instructions. The steps further include implementing the modified graph-based representation of AI/ML workload execution in an emulated test case using an emulation engine.

According to another aspect of the non-transitory computer readable medium described herein, expanding the collective communication node comprises replacing the collective communication node with send and receive nodes.

BRIEF DESCRIPTION OF THE DRAWINGS

The subject matter described herein will now be explained with reference to the accompanying drawings of which:

FIG. 8A is a display of ReduceScatter results for protocol RoCEv2;

FIG. 8C is a partial display of emulator stream statistics using protocol RoCEv2.

DETAILED DESCRIPTION

The subject matter described herein includes methods, systems, and computer readable media for emulating a distributed computing scenario using a graph-based representation of AI/ML workload execution with an expanded collective communication operation. A test platform receives a graph-based representation of AI/ML workload execution, such as a Chakra execution trace, and expands the high-level collective communication operation represented by a collective communication node to low-level operations represented by send and receive nodes. This allows the user to view the communications among the send and receive nodes that carry out the collective communication algorithm. The test platform can define a finite state machine based on the expanded collective communication algorithm for utilization in a test case. The test platform can include an emulation engine and/or a simulation engine configured to emulate and/or simulate, respectively, a test case scenario implementing the test case with the expanded collective communication algorithm. A user can also revise the expanded collective communication by replacing a portion or all of the collective communication algorithm in the original execution trace with a different collective communication algorithm. For each emulated and/or simulated test case implementing an execution trace, the test platform can record and report performance metrics, such as job or collective completion time, allowing a user to compare the results with different collective communication algorithms and determine an optimal collective communication algorithm for the execution trace.

Figure 1A:
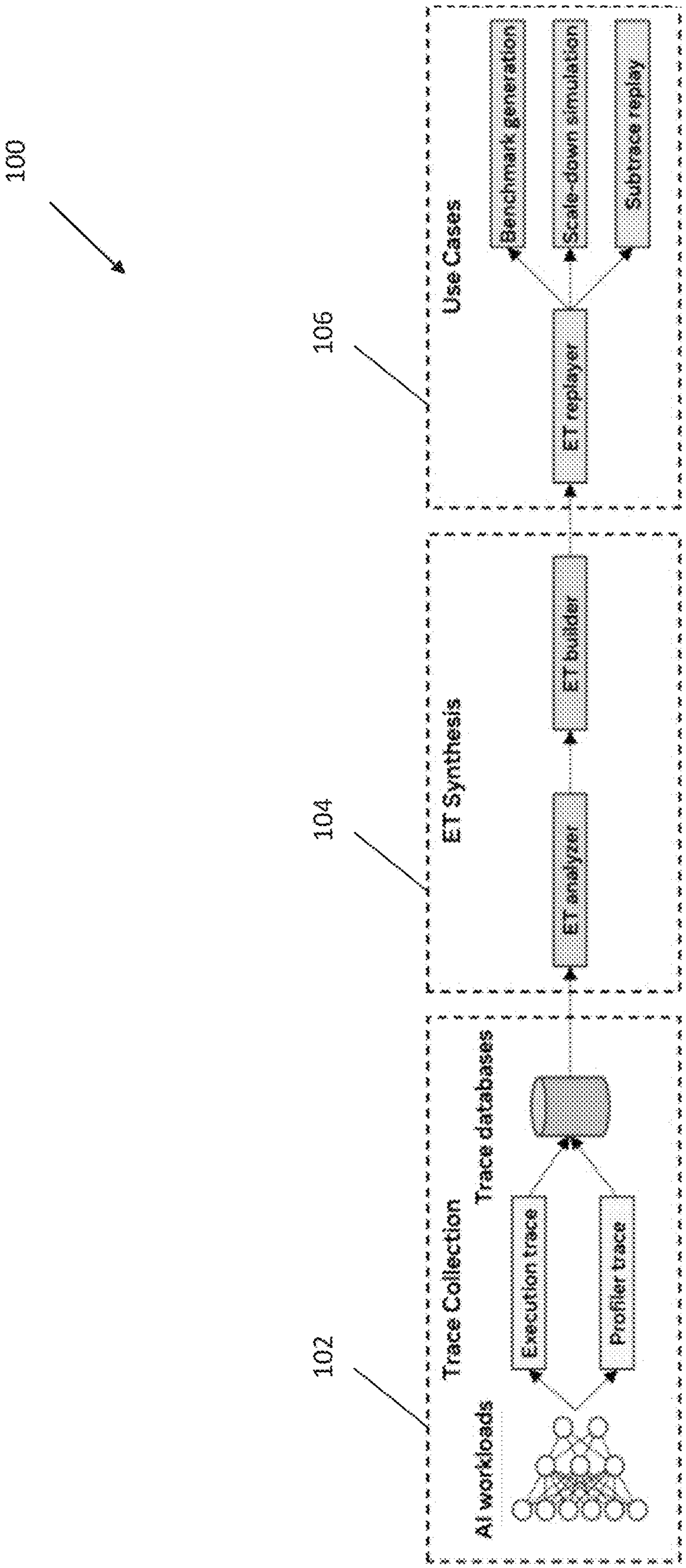
Prior Art FIG. 1A
FIG. 1A is a flow diagram illustrating a prior art Chakra ecosystem.

FIG. 1A is a flow diagram 100 illustrating the prior art Chakra ecosystem. Chakra provides an open, interoperable graph-based depiction of AI/ML workload execution with the Chakra execution trace. The Chakra execution trace is a standardized schema for performance modeling. The Chakra execution trace captures core operations—including compute, memory, and communication—along with their dependencies, timing, and metadata to facilitate benchmarking and optimization of AI/ML training and usage across a distributed computing system. At trace collection 102, Chakra gathers one or more traces, such as execution traces and profiler traces, based on AI workloads and stores them in a trace database. The traces can come from different sources, such as different companies, that utilize different hardware platforms and generate traces in different formats. Chakra can also receive execution traces from synthetic trace generators. At execution trace synthesis 104, Chakra analyzes the received traces and combines them to generate a new Chakra execution trace. At use cases 106, Chakra can implement the Chakra execution trace using a simulator or emulator, and create a benchmark based on the resulting performance of the Chakra execution trace, and adjust the execution traces and replay the simulation or emulation to compare performances of altered Chakra execution traces with the benchmark from the original Chakra execution trace.

Figure 1B:
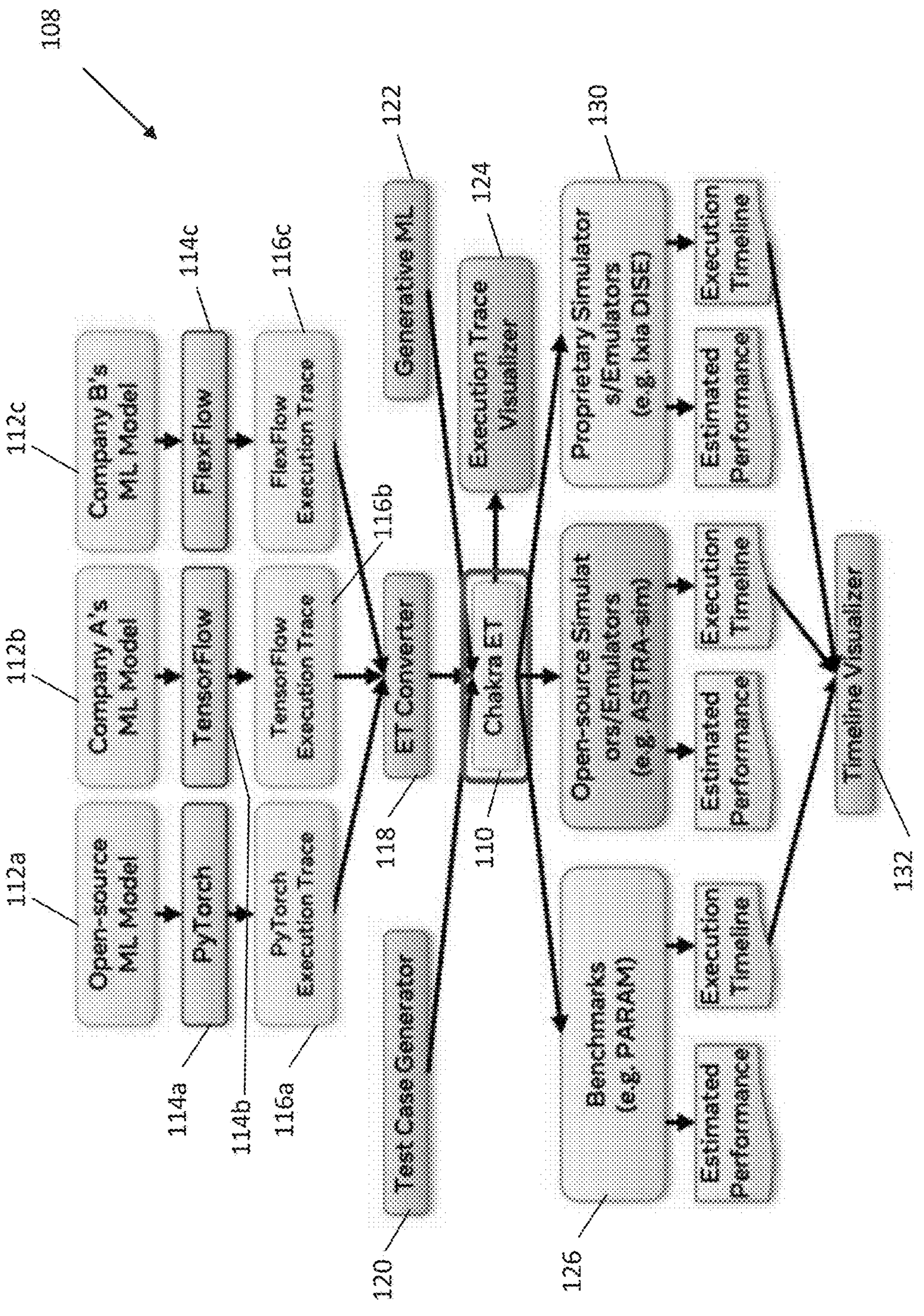
Prior Art FIG. 1B
FIG. 1B is a flow diagram illustrating a prior art utilization of a Chakra execution trace.

FIG. 1B is a flow diagram 108 illustrating a prior art utilization of a Chakra execution trace 110. In the example shown in FIG. 1B, Chakra generates Chakra execution trace 110 sourced from an execution trace from one of three different sources each using different ML frameworks, although the Chakra execution trace 110 can be sourced from an execution trace on another ML framework not shown. The execution traces received from other sources can include information related to compute and communication operator dimensions and dependencies, while not disclosing model and dataset details due to proprietary concern. A first ML model 112*a* is an open-source ML model developed on a first ML framework 114*a*, which in this example is PyTorch, resulting in a first execution trace 116*a* that is a PyTorch execution trace. A second ML model 112*b* is Company A's ML model developed on a second ML framework 114*b* TensorFlow, resulting in a second execution trace 116*b* that is a TensorFlow execution trace. A third ML model 112*c* is Company B's ML model developed on a third ML framework 114*c*, which in this example is FlexFlow, resulting in a third execution trace 116*c* that is a Flexflow execution trace. Chakra converts a received execution trace, such as execution trace 116*a*, execution trace 116*b*, or execution trace 116*c*, using an execution trace converter 118 that extracts information from the received execution trace to generate Chakra execution trace 110. This allows a user to generate Chakra execution trace 110 regardless of the ML framework used for the original execution trace.

A test case generator 120 generates execution traces by offering libraries to describe traces. A generative ML 122 is configured to produce representative executive traces based on existing executive traces. An execution trace visualizer 124 can generate a visual representation of Chakra execution trace 110 for a user to visualize dependencies between nodes in a trace.

Benchmarks 126 can collect and generate benchmarks for AI/ML workloads in production. Benchmarks 126 can include replay benchmarks, which are configured to replay traces, such as Chakra execution trace 110, to mimic the application behavior. Benchmarks 126 can include third-party benchmarks such as PARAM, including PARAM Comms Replay benchmarks that replay collective communication operations. Open-source simulators/emulators 128, such as ASTRA-sim, and proprietary simulators/emulators 130 can be used for performance modeling. A user can adjust the number of NPUs and/or network bandwidth and measure the performance of the implemented execution trace with the adjustments using open-source simulators/emulators 128 and proprietary simulators/emulators 130. Benchmarks 126, open-source simulators/emulators 128, and proprietary simulators/emulators 130 can each measure and collect performance metrics of the implemented execution traces and record execution timelines. A timeline visualizer 132 displays task execution of each NPU in a timeline, where tasks running on each NPU are represented as bars on the timeline and include their start and finish times.

Figure 1C:
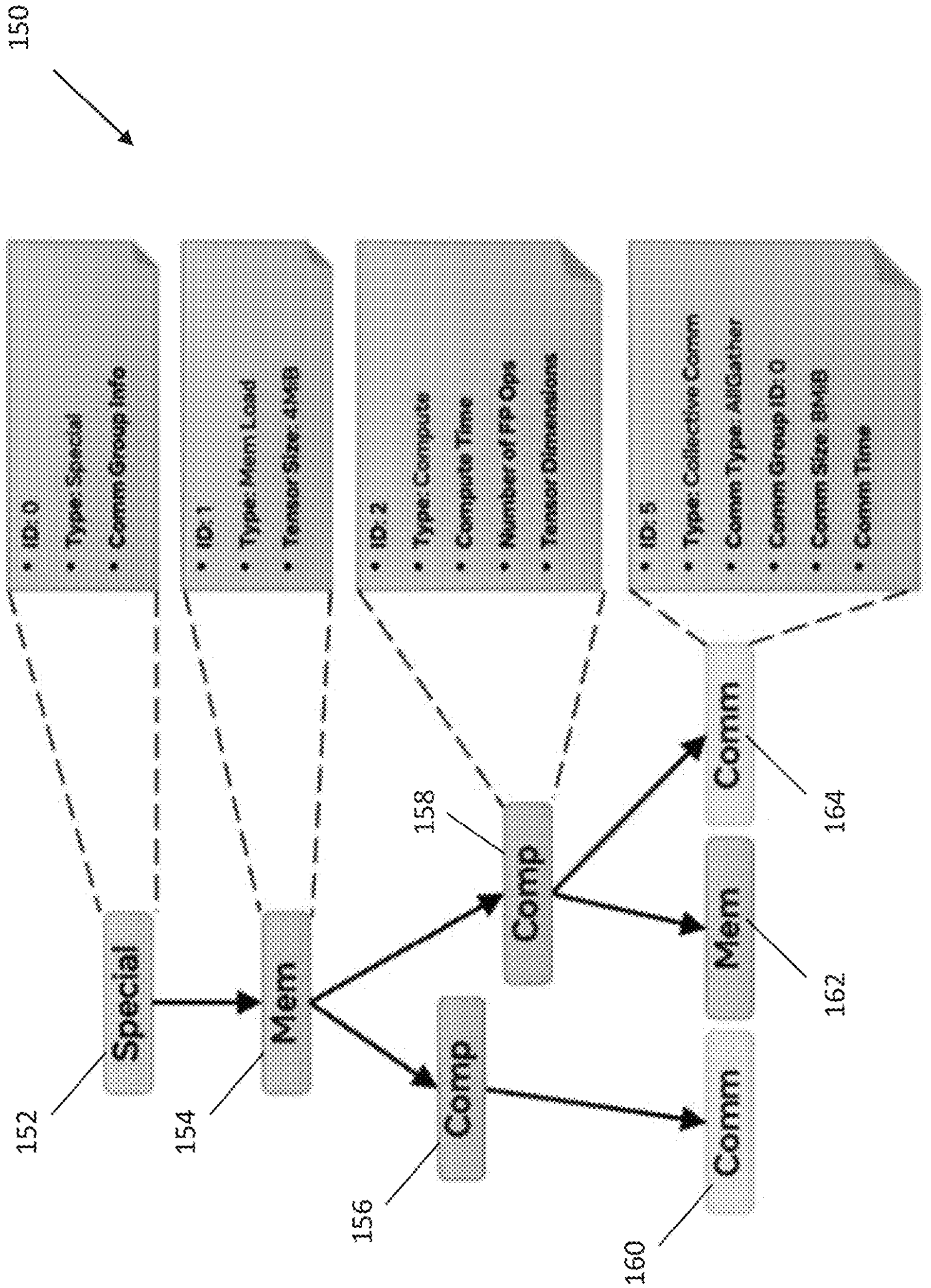
Prior Art FIG. 1C
FIG. 1C is a flow diagram of nodes in a prior art Chakra execution trace.

FIG. 1C is a flow diagram 150 of nodes in a prior art Chakra execution trace. The nodes in Chakra represent compute, memory, and communication/networking operations with field types INVALID, MEM_LOAD, MEM_STORE, COMP, COMM_SEND, COMM_RECV, COMM_COLL, and SPECIAL. Nodes 152, 154, 156, 158, 160, 162, and 164 represent special, memory, compute, compute, communication/networking, memory, and communication/networking operations, respectively. Node 164 includes field type COMM_COLL and is a collective communication node representing a collective communication operation, in this example AllGather.

Figure 2:
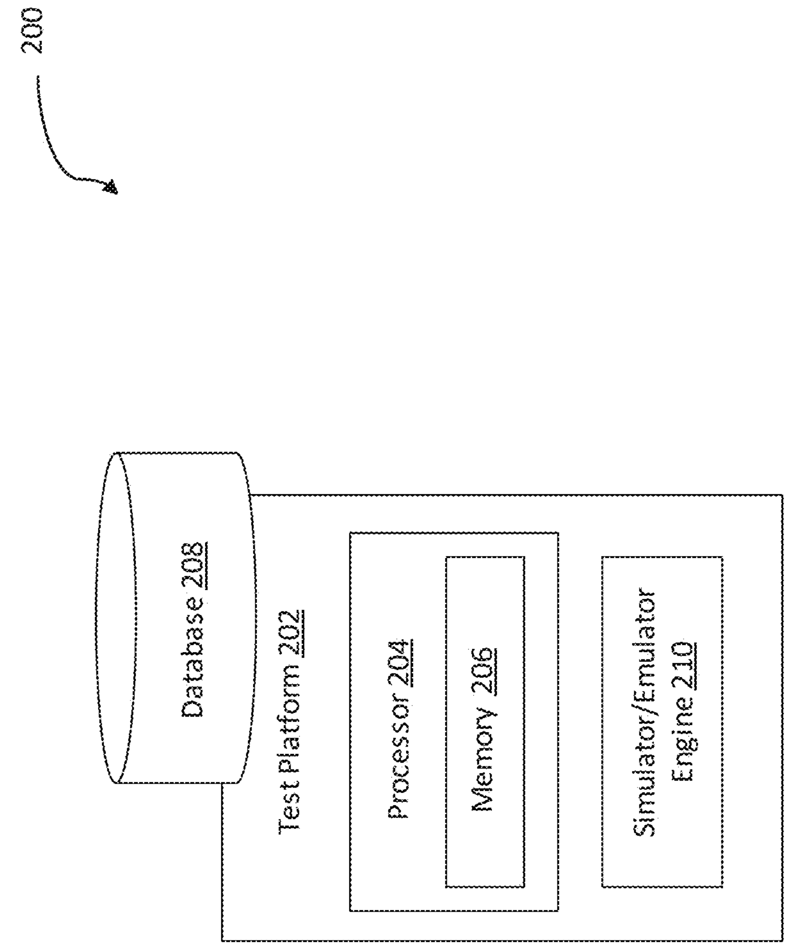
FIG. 2 is a block diagram illustrating an example system for emulating a distributed computing scenario using a graph-based representation of AI/ML workload execution with an expanded collective communication operation.

FIG. 2 is a block diagram illustrating an example system 200 for emulating a distributed computing scenario using a graph-based representation of AI/ML workload execution with an expanded collective communication operation. A graph-based representation of AI/ML workload execution can include a workload execution trace or graph. A nonlimiting example of a graph-based representation of AI/ML workload execution is a Chakra execution trace, but it is understood that the subject matter can be used with other graph-based representations of AI/ML workload execution. System 200 includes a test platform 202 with at least one processor 204 and memory 206. Test platform 202 may include, without limitation, a microcontroller, microprocessor, digital signal processor (DSP) and/or system on a chip (SoC) as described herein. Test platform 202 may include a single computing device operating independently, or may include two or more computing devices operating in concert, in parallel, sequentially or the like; two or more computing devices may be included together in a single computing device or in two or more computing devices. Test platform 202, using processor 204 and memory 206, may be configured to perform any of the steps described herein. Test platform 202 can include a database 208 from which the test platform 202 can store, access, edit, and retrieve information such as datasets and graph-based representations of AI/ML workload executions, for example execution traces. Database 208 can include a cloud drive. Test platform 202 can include a simulator engine and/or emulator engine 210 configured to simulate and/or emulate, respectively, test cases implementing an execution trace as described herein.

Figure 3:
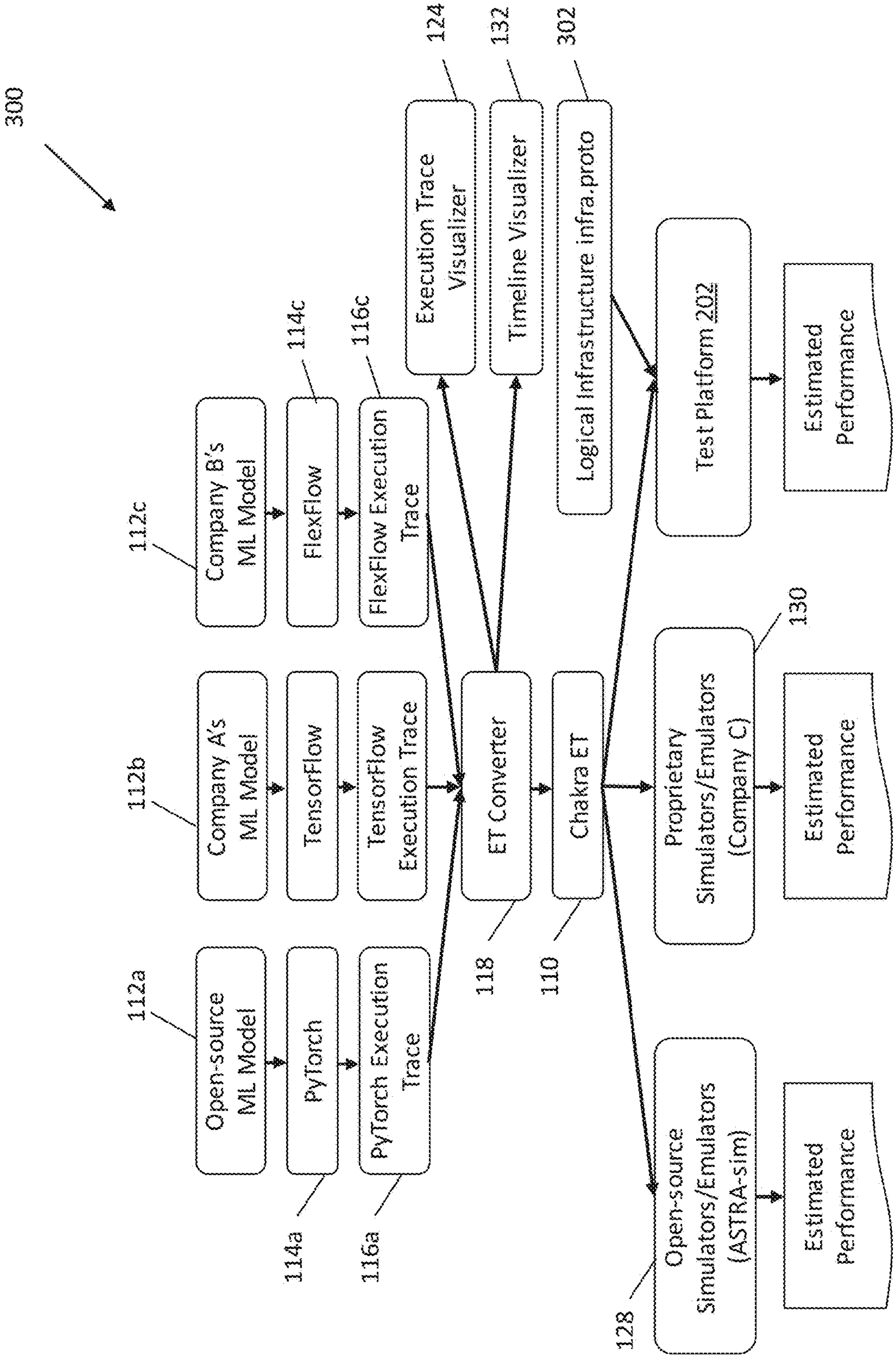
FIG. 3 is a flow diagram of an end-to-end Chakra fully cycle emulator integration utilizing a test platform.

FIG. 3 is a flow diagram 300 of an end-to-end Chakra fully cycle emulator integration utilizing test platform 202. FIG. 3 shows Chakra execution trace 110 being used by test platform 202, however it is understood that test platform 202 can be used with other graph-based representations of AI/ML workload execution. Similar to diagram 108 shown in FIG. 1B, FIG. 3 includes ML models from different sources using different ML frameworks, such as first ML model 112*a* open-source ML model developed on first ML framework 114*a* PyTorch to create first execution trace 116*a* PyTorch execution trace, second ML model 112*b* Company A's ML model developed on second ML framework 114*b* TensorFlow to create second execution trace 116*b* TensorFlow execution trace, and third ML model 112*c* Company B's ML model developed on third ML framework 114*b* FlexFlow to create third execution trace 116*c* FlexFlow execution trace. Chakra converter 118 converts execution trace 116*a*, execution trace 116*b*, or execution trace 116*c* to Chakra execution trace 110. Chakra converter 118 can convert execution traces not shown here, such as execution traces built on convolutional neural network (CNN) architectures like AlexNet. Chakra execution trace 110 can be tested utilizing open-source simulators/emulators 128 and proprietary simulators/emulators 130.

Unlike diagram 108 shown in FIG. 1B, FIG. 3 also includes a logical infrastructure infra.proto 302 and test platform 202. Logical infrastructure infra.proto 302 is a system visualizer that Chakra execution trace 110 can be replayed over. Logical infrastructure infra.proto 302 can receive infra.proto, which describes the underlying cluster infrastructure including node schematics within a node, such as a collective communication node, and intra-node network topology. Logical infrastructure infra.proto 302 can provide a visualization of infra.proto. The system visualizer is a graph representation that allows for capturing detail of the devices, components and links that make up an infrastructure, thereby providing a visualization of the cluster schematics.

Test platform 202 receives a graph-based representation of AI/ML workload execution, such as Chakra execution trace 110, comprising at least one collective communication node. Each collective communication node can represent multiple communication nodes, multi-processing libraries, and/or collective communication operations. Nonlimiting examples of collective communication operations can include Broadcast, Reduce, AllReduce, Scatter, Gather, AllGather, Barrier, and Scan, which each have different algorithms for implementing the operation. Example versions of the AllReduce collective communication operation can include Ring-AllReduce, Tree-structured AllReduce, Recursive Doubling AllReduce, Butterfly AllReduce, Halving Doubling AllReduce, Scatter-AllGather, Pairwise Exchange AllReduce, Rabenseifner's AllReduce, two-dimensional (2D) Mesh AllReduce, and BiRing AllReduce. The optimal algorithm for implementing a collective communication operation depends on factors such as the cluster infrastructure, the number of nodes, and the characteristics of the machine learning model. The choice of the "all reduce" algorithm depends on the specific requirements and constraints of the distributed computing system. Factors such as network bandwidth, latency, and the number of nodes influence the performance of these algorithms in different scenarios.

Test platform 202 expands the collective communication node by replacing a collective communication operation of the collective communication node with low-level processing instructions. The low-level processing instructions can include send and receive primitives. Test platform 202 can expand a collective communication node by replacing the collective communication node with send and receive nodes. This allows a user to view the low-level communications that were represented in the high-level collective communication node. For example, a collective communication node representing an AllReduce algorithm can be expanded to show that the type of AllReduce algorithm is a Ring-AllReduce algorithm. Test platform 202 can also display a representation of the expanded collective communication node for a single rank, such as rank 0, rank 1, rank 2, etc. Examples of expansion by test platform 202 are shown in FIGS. 4A-4B and 7A-7C. Test platform 202 can also receive the infrastructure graph from logical infrastructure infra.proto 302 and use the infrastructure graph in conjunction with Chakra execution trace 110 to expand the collective communication node. For example, an AllReduce collective communication can be expanded to primitive send/receive nodes and, depending on the infrastructure graph, test platform 202 can mark the send/receive nodes as using specific paths in infrastructure links and device links such as nvlink, pcie, etc.

Test platform 202 can modify collective communication algorithms by revising the send and receive primitives, the send and receive nodes, and/or the low-level processing instructions among the send and receive nodes. In this example, a user can replace the expanded Ring-AllReduce algorithm with another collective communication algorithm, such as a Scatter-AllGather algorithm. This allows a user to test and determine an optimal collective communication algorithm for the execution trace, which specifies the distributed computing environments it will be utilizing, by expanding and modifying low-level processing instructions. Test platform 202 can include a programmable logic device resource. The user-specified collective communication algorithm can be defined in terms of a finite state machine, which can be implemented in the programmable logic device resource. The programmable logic device resource may include, for example, a field-programmable gateway array (FPGA) and/or an application-specific integrated circuit (ASIC) based on P4 or another programming or declarative configuration language (e.g., Broadcom NPL, XML, JSON, etc.). The finite state machine can be used during execution of a test case.

Test platform 202 generates a modified graph-based representation of AI/ML workload execution including the low-level processing instructions, which may be low-level processing instructions revised by a user as described herein. Test platform 202 implements the modified graph-based representation of AI/ML workload execution in an emulated test case using an emulation engine. In some aspects of the described subject matter, test platform 202 can include an emulation engine, such as simulation/emulation engine 210 shown in FIG. 2. It is understood that, as described herein, emulation can include emulation and/or simulation and, therefore, test platform 202 can be configured to implement a modified execution trace in a simulated test case using a simulation engine and the test platform 202 can include the simulation engine. Test platform 202 can define a collective communication algorithm based on the low-level processing instructions, which may be an expansion of the collective communication operation or may be revised low-level processing instructions. The collective communication algorithm can include finite state machine instructions that define the low-level processing instruction, for example a ring-all reduce algorithm. The emulated test case then uses the collective communication algorithm to implement the workload execution, such as Chakra execution trace 110 that has been modified with the revised collective communication algorithm, in a simulated/emulated test case.

Test platform 202 can report at least one performance metric from the executed emulated test case, such as total job completion time, collective completion time for each communication, or a degree or timespan each NPU was used. With the expanded collective communication operation, a user can easily create many revisions of the execution trace each using different collective communication algorithms, and implement the revisions in a test case. Test platform 202 can compare the performance metrics to determine an optimal collective communication algorithm for the execution trace.

Figure 4A:
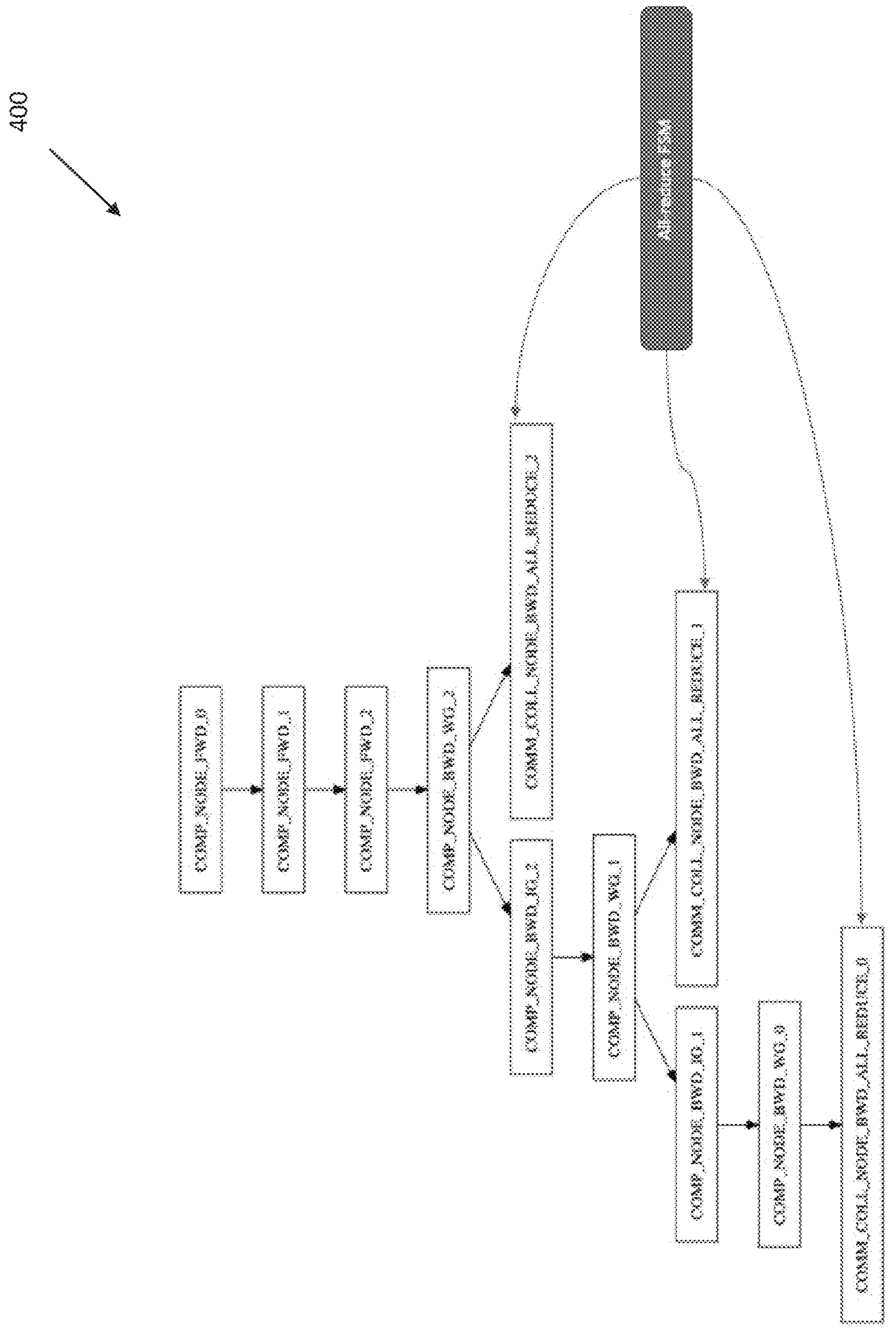
FIG. 4A is a flow diagram illustrating a workload directed acyclic graph.
Figure 4B:
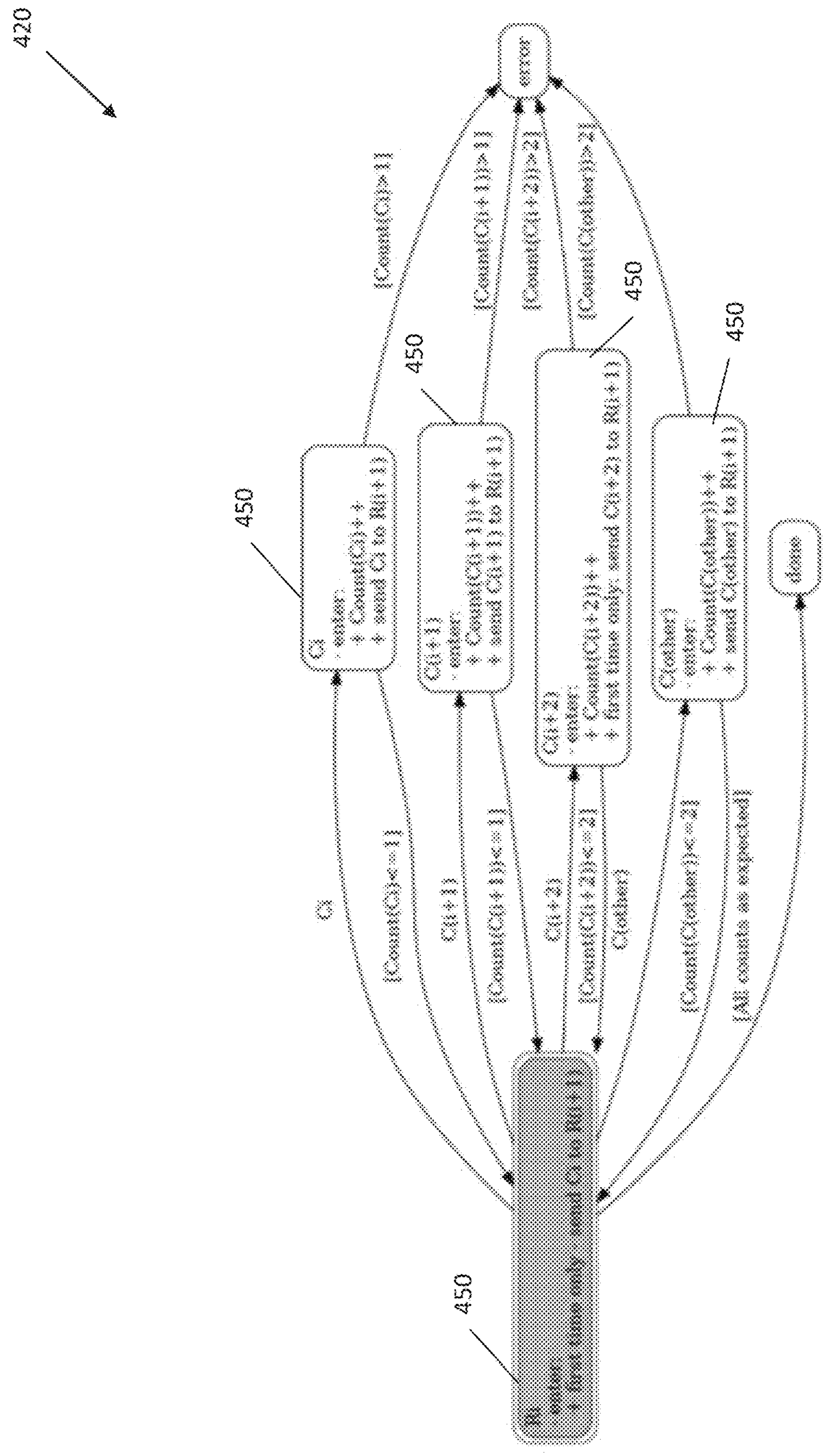
FIG. 4B is a flow diagram illustrating a state machine of an expansion of collective communication operations from FIG. 4A.

FIG. 4A is a flow diagram 400 illustrating a workload directed acyclic graph (DAG). The nodes represent compute, memory, and communication operations, while the edges between the nodes represent data dependencies. In this example workload DAG, there are three collective communication nodes, each of which represent an AllReduce collective communication operations: COMM_COLL_NODE_BWD_ALL_REDUCE_2, COMM_COLL_NODE_BWD_ALL_REDUCE_1, and COMM_COLL_NODE_BWD_ALL_REDUCE_0. FIG. 4B is a flow diagram 440 illustrating a finite state machine of an expansion of the collective communication operations from FIG. 4A, showing the low-level processing instructions between send/receive nodes 450.

Figure 5:
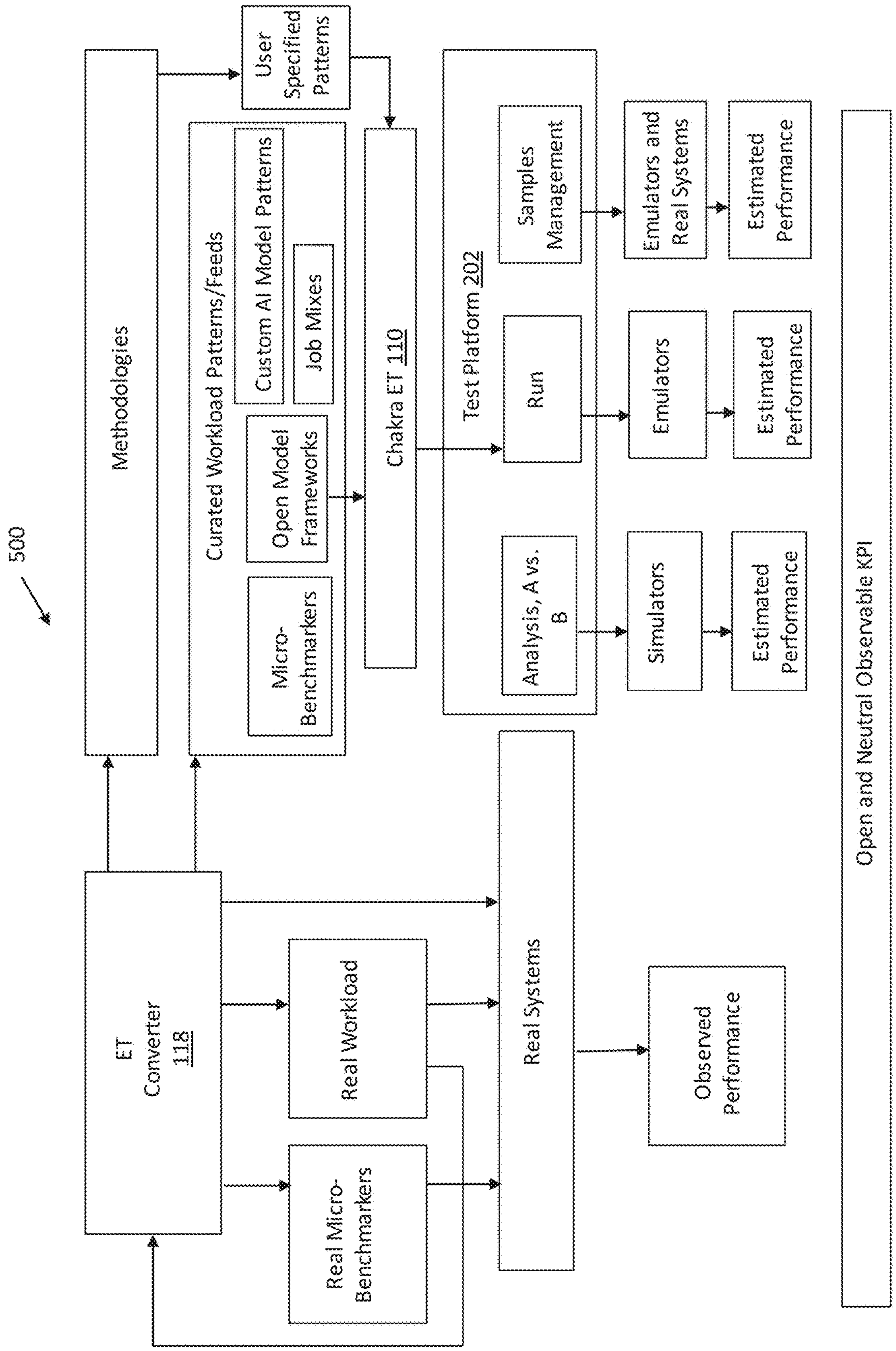
FIG. 5 is a high-level process diagram of a test platform.

FIG. 5 is a high-level process diagram 500 of test platform 202. Execution trace converter 118 converts execution traces on various ML platforms into Chakra execution trace 110. Test platform 202 processes Chakra execution trace 110 and applies expansion processing to user-specified collective communication operations that are defined therein. The augmented Chakra execution trace produced via this expansion processing, which includes one or more low-level instructions that define a state machine for implementing specific collective communication algorithms in a test and emulation environment, is then implemented by an emulation engine (e.g., IxPerf, etc.) and used in the execution of an associated test case. Performance of the distributed computing environment is monitored and recorded by test platform 202 and reported to the user.

Test platform 202 provides a dynamic collective communication algorithm switching functionality. Using test platform 202, a user can quickly and easily specify a new collective communication algorithm, for example via a user interface or configuration API, for any collective communication operation defined in the Chakra execution trace and re-run the test case.

Figure 6:
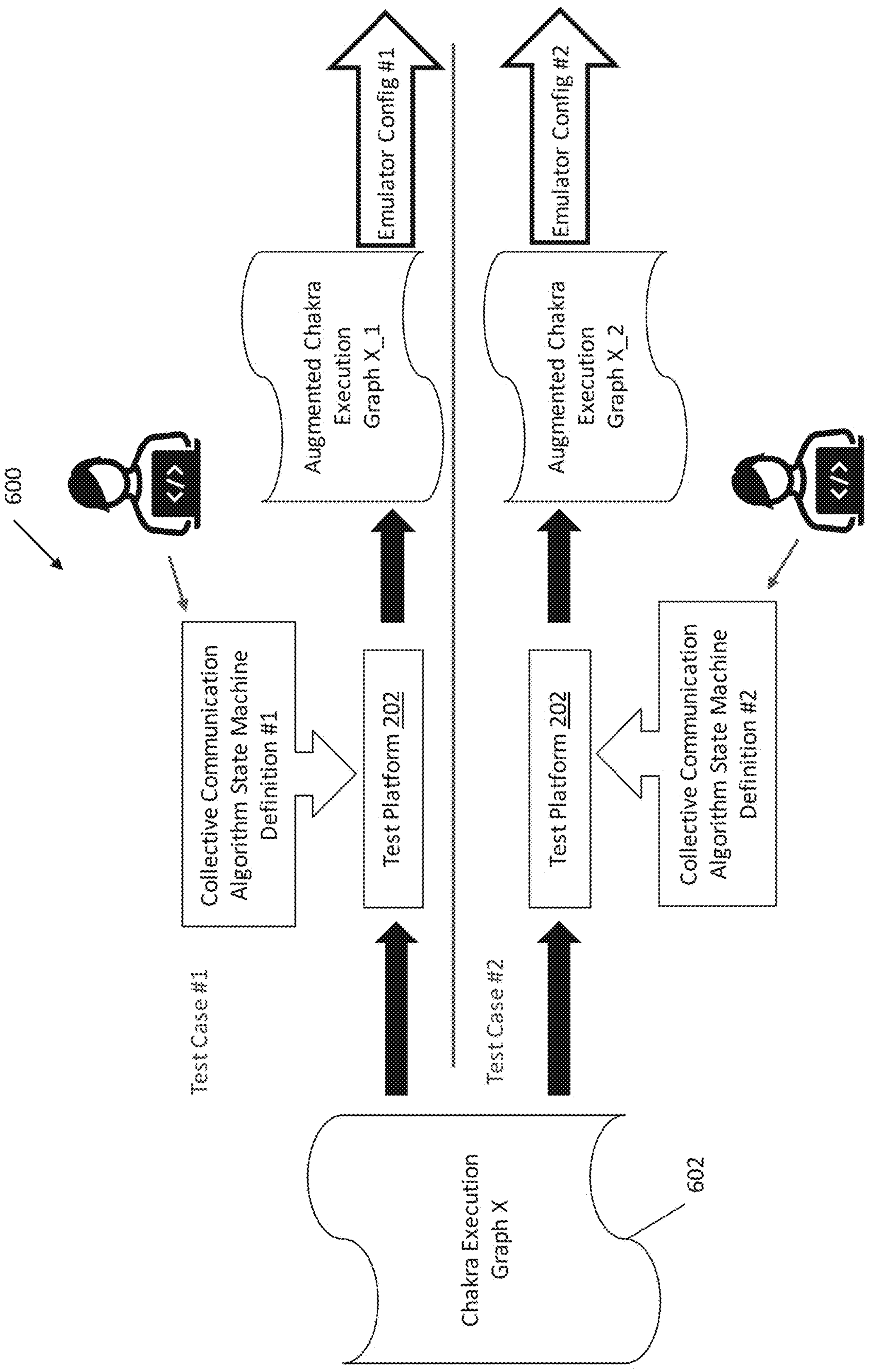
FIG. 6 is a high-level process flow diagram showing a test platform in use.

FIG. 6 is a high-level process flow diagram 600 showing test platform 202 in use. FIG. 6 illustrates test platform's 202 ability to allow a user to easily execute test cases that are variations of a common base input execution graph, such as the example Chakra execution graph X 602 shown in FIG. 6. For any given Chakra execution graph input, the user can specify a particular collective communication algorithm that is to be used for a collective communication operation in the input graph. In this example for the first test case, on test platform 202, the user revises the original collective communication operation in Chakra execution graph X 602 to a collective communication algorithm #1 that defines a state machine definition #1. Test platform 202 generates a modified or augmented version of Chakra execution graph X 602, namely augmented Chakra execution graph X_1, which the emulator engine uses to implement an emulator configuration #1 for an emulated test case. Similarly in the second test case and on test platform 202, the user revises the original collective communication operation in Chakra execution graph X 602 to a collective communication algorithm #2, distinct from the collective communication algorithm #1, that defines a state machine definition #2. Test platform 202 generates a modified or augmented version of Chakra execution graph X 602, namely augmented Chakra execution graph X_2, which the emulator engine uses to implement an emulator configuration #2 for an emulated test case. In this manner, the user is able to continually modify collective communication algorithms and test and compare performance results of emulated test cases implementing the respective collective communication algorithms.

Figure 7A:
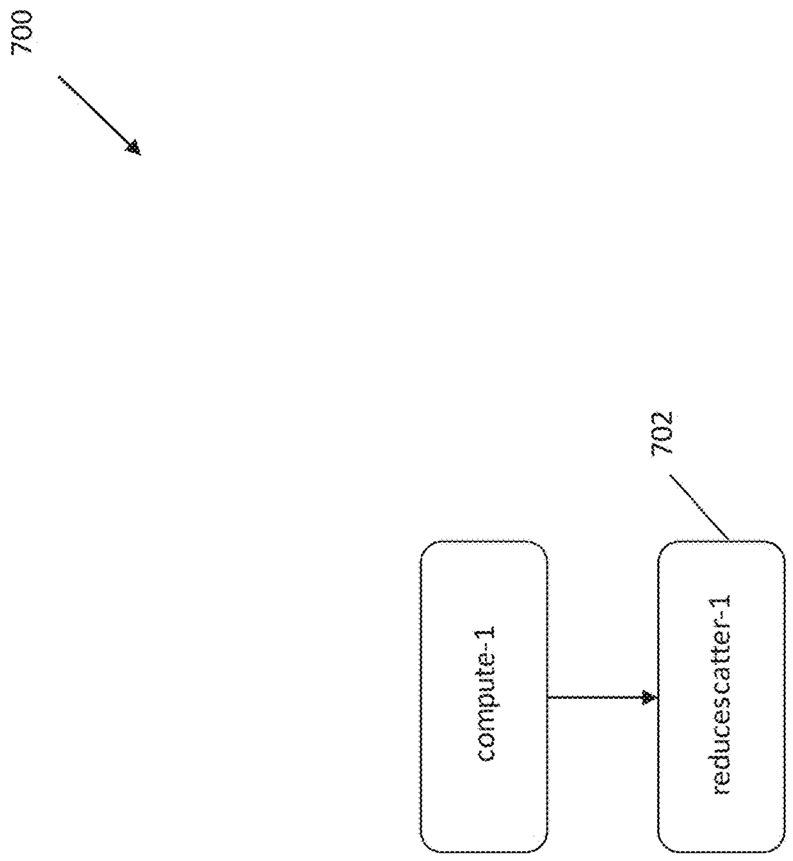
FIG. 7A is a flow diagram illustrating a portion of an execution trace.
Figure 7B:
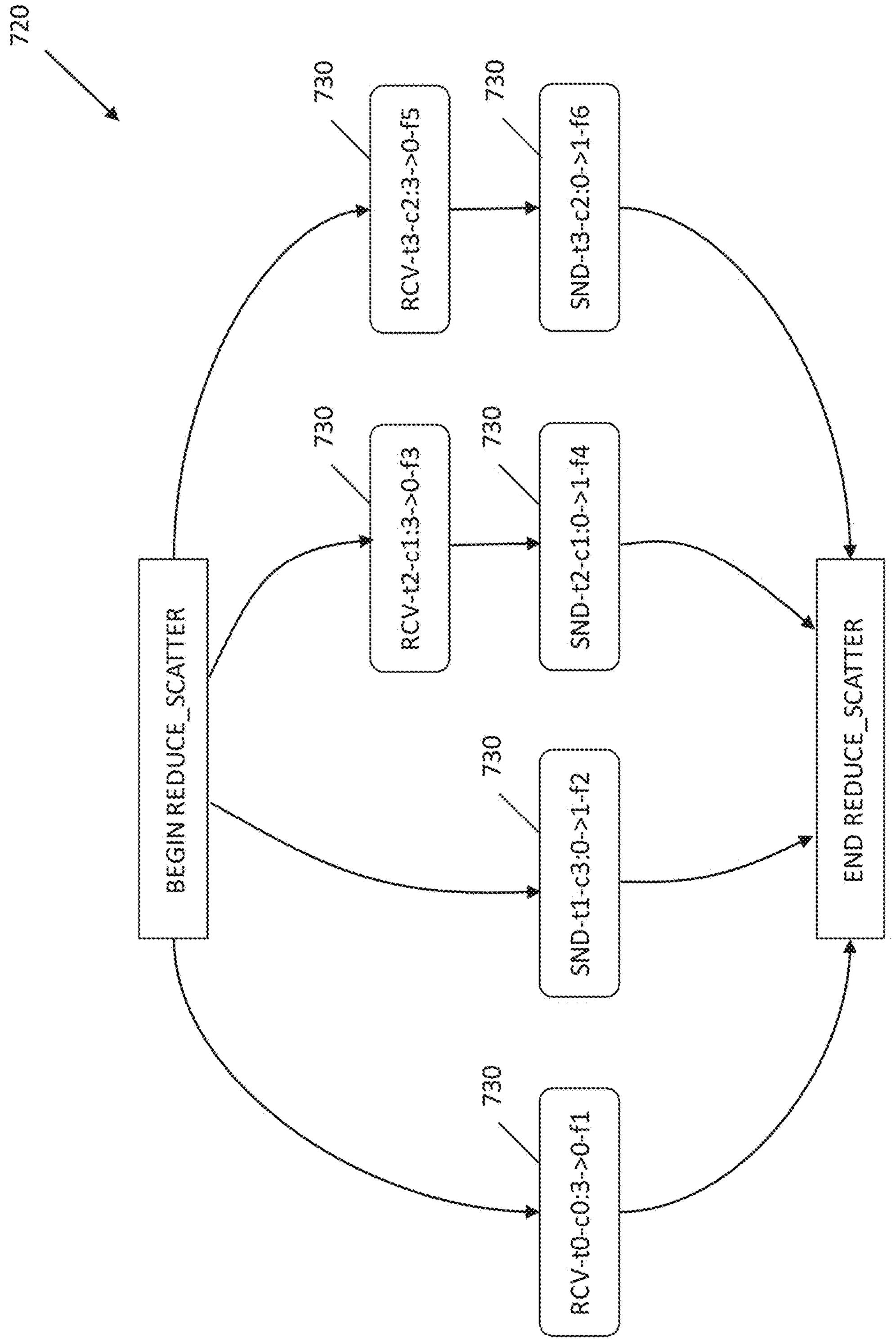
FIG. 7B is a flow diagram illustrating a collective communication expansion of the collective communication node in FIG. 7A for rank 0.
Figure 7C:
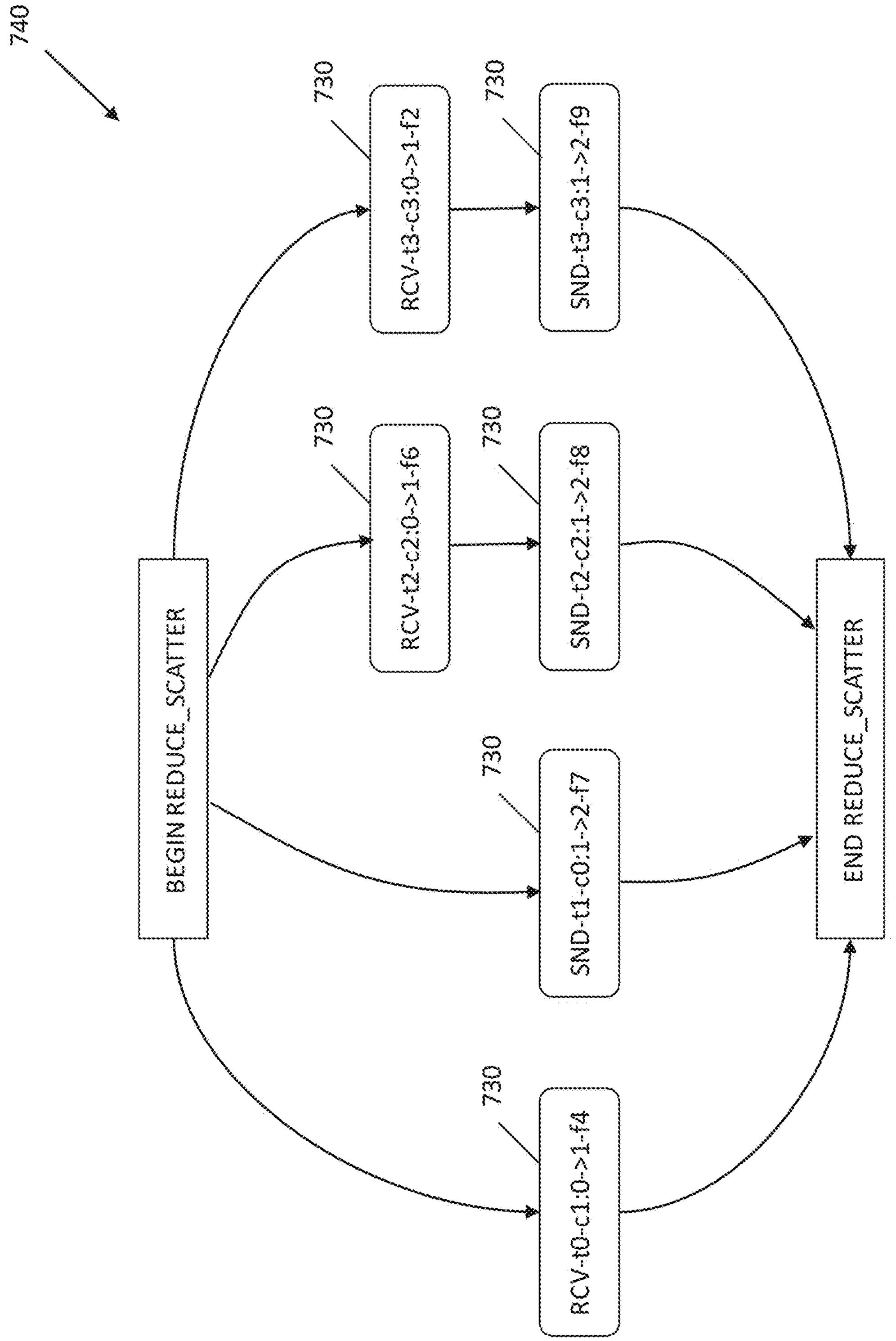
FIG. 7C is a flow diagram illustrating a collective communication expansion of the collective communication node in FIG. 7A for rank 1.

FIG. 7A is a flow diagram 700 illustrating a portion of an execution trace that includes a collective communication node 702 named reducescatter-1. Collective communication node 702 represents a collective communication algorithm ReduceScatter. Test platform 202 may display a representation of an expanded collective communication node and a represent low-level processing instructions for a specific send/receive node, i.e., a specific rank. FIG. 7B is a flow diagram 720 illustrating a collective communication expansion for rank 0 of collective communication node 702 shown in FIG. 7A. FIG. 7C is a flow diagram 740 illustrating a collective communication expansion for rank 1 of collective communication node 702 shown in FIG. 7A. FIGS. 7B-7C show send/receive nodes 730 and the low-level processing instructions between ranks.

Figure 8B:
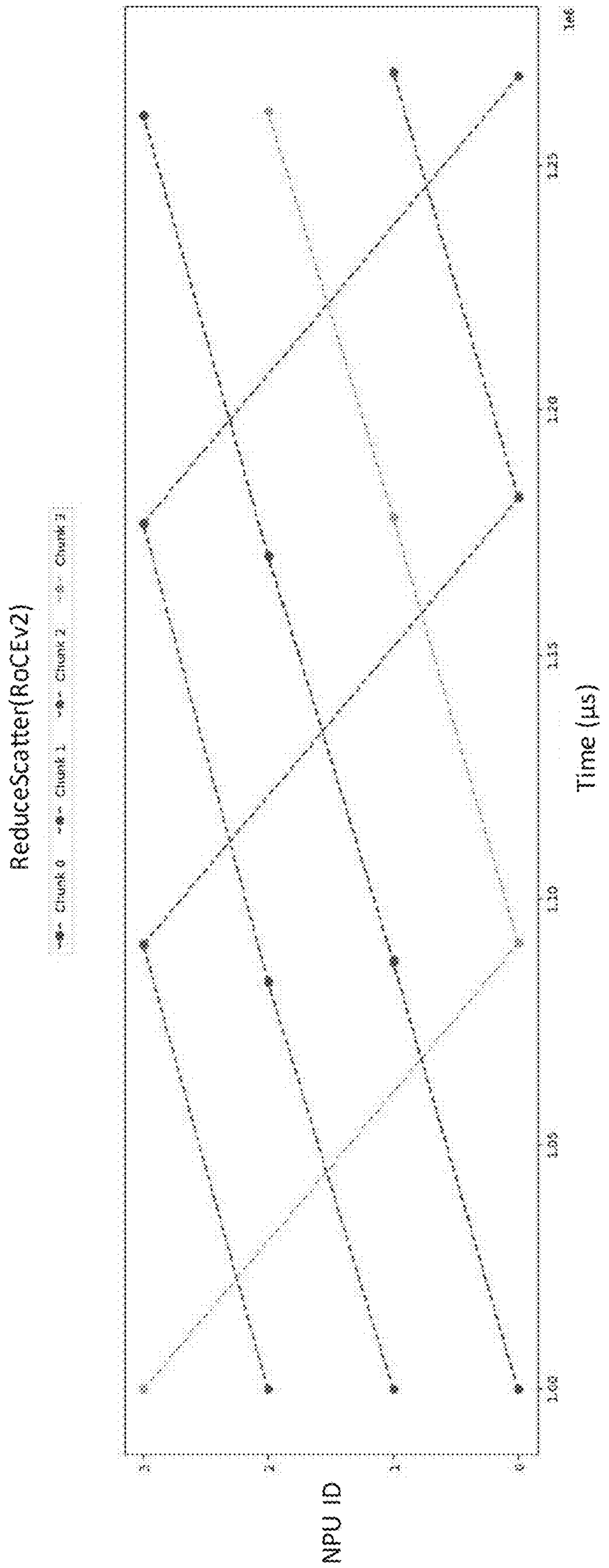
FIG. 8B is a chart of the time and NPU ID of ReduceScatter results using protocol RoCEv2.

FIG. 8A is a display 800 of ReduceScatter results for an example protocol RoCEv2. Display 800 lists the steps performed in executing the protocol and the respective times the steps were performed. Display 800 also includes the job completion time of protocol RoCEv2. FIG. 8B is a chart 820 of the time, in microseconds, and NPU identifications (IDs) of ReduceScatter results using protocol RoCEv2. Chart 820 includes lines representing communications sent between NPU IDs, indicating when each NPU ID sends and receives information, from which NPU ID the communications were received, and to which NPU ID the communications were sent.

FIG. 8C is a partial display 840 of emulator stream statistics using protocol RoCEv2. Partial display 840 includes example metrics of communications performed during the implementation of the modified execution trace in an emulated test case. Metrics shown in FIG. 8C include the duration of each communication between send/receive nodes, start time, end time, and number of bytes and packets transmitted and received.

Figure 9:
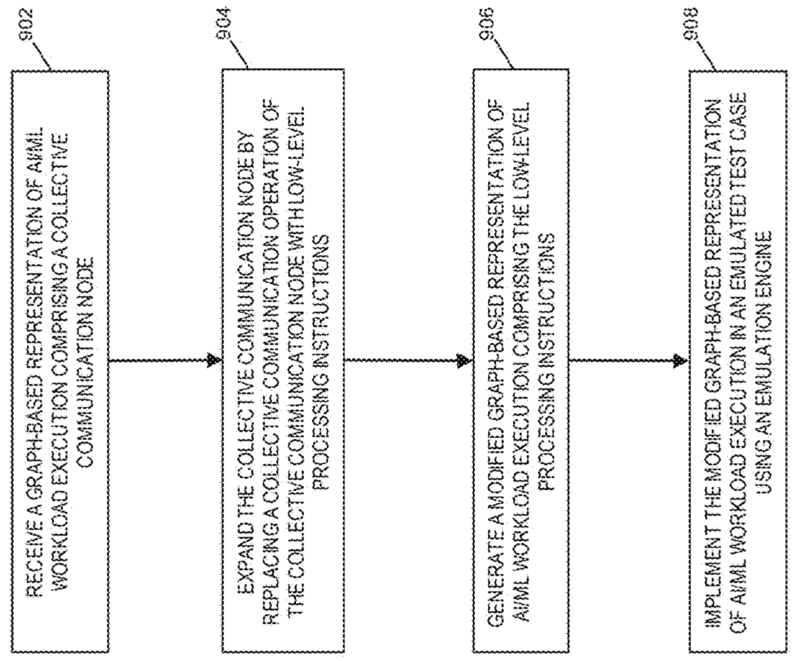
FIG. 9 is a flow diagram illustrating an example method for providing a testing and validation platform for machine learning lifecycle testing and validation.

FIG. 9 is a flow diagram illustrating an example method 900 for emulating a distributed computing scenario using a graph-based representation of AI/ML workload execution with an expanded collective communication operation. At step 902, a test platform receives a graph-based representation of AI/ML workload execution comprising a collective communication node.

At step 904, the test platform expands the collective communication node by replacing a collective communication operation of the collective communication node with low-level processing instructions. The low-level processing instructions can be based on the collective communication operation. In other aspects of the described subject matter, the test platform can revise the low-level processing instructions to define a revised collective communication algorithm. The low-level processing instructions can include send and receive primitives. Expanding the collective communication node can include replacing the collective communication node with send and receive nodes. The test platform can display a representation of the expanded collective communication node for a single rank.

At step 906, the test platform generates a modified graph-based representation of AI/ML workload execution comprising the low-level processing instructions. The test platform can define a collective communication algorithm based on the low-level processing instructions, wherein the emulated test case uses the collective communication algorithm.

At step 908, the test platform implements the modified graph-based representation of AI/ML workload execution in an emulated test case using an emulation engine. The test platform can report at least one performance metric from the executed emulated test case. The test platform can compare performance metrics from a first executed emulated test case using the low-level processing instructions based on the collective communication operation and from a second executed emulated test case using the revised collective low-level processing instructions.

It will be appreciated that method 900 is for illustrative purposes and that different and/or additional actions may be used. It will also be appreciated that various actions described herein may occur in a different order or sequence. It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for emulating a distributed computing scenario using a graph-based representation of artificial intelligence/machine learning (AI/ML) workload execution with an expanded collective communication operation, the method comprising:

receiving, at a test platform, a graph-based representation of AI/ML workload execution comprising a collective communication node;

expanding, by the test platform, the collective communication node by replacing display of a single node corresponding to a collective communication operation of the collective communication node with display of a plurality of nodes that correspond to low-level processing instructions used to implement the collective communication operation;

generating, by the test platform, a modified graph-based representation of AI/ML workload execution comprising the low-level processing instructions, wherein generating the modified graph-based representation of the AI/ML workload execution includes modifying the low-level processing instructions to replace the collective communication operation implemented by the low-level processng instructions prior to the modifying with a different collective communication operation; and implementing, by the test platform, the modified graph-based representation of AI/ML workload execution in an emulated test case using an emulation engine.

2. The method of claim 1 wherein the low-level processing instructions comprise send and receive primitives.

3. The method of claim 2 wherein expanding the collective communication node comprises replacing the collective communication node with send and receive nodes.

4. The method of claim 3 comprising displaying a representation of the expanded collective communication node for a single rank.

5. The method of claim 1 wherein the emulated test case uses the different collective communication operation.

6. The method of claim 1 comprising reporting at least one performance metric from the executed emulated test case.

7. The method of claim 1 comprising comparing performance metrics from a first executed emulated test case using the low-level processing instructions based on the collective communication operation prior to the modifying and from a second executed emulated test case using the low-level processing instructions after the modifying.

8. A system for emulating a distributed computing scenario using a graph-based representation of artificial intelligence/machine learning (AI/ML) workload execution with an expanded collective communication operation, the system comprising:

a test platform including at least one processor and a memory, the test platform implemented by the at least one processor for:

receiving a graph-based representation of AI/ML workload execution comprising a collective communication node;

expanding the collective communication node by replacing display of a single node corresponding to a collective communication operation of the collective communication node with a plurality of nodes that represent low-level processing instructions used to implement the collective communication operation;

generating a modified graph-based representation of AI/ML workload execution comprising the low-level processing instructions, wherein generating the modified graph-based representation of the AI/ML workload execution includes modifying the low-level processing instructions to replace the collective communication operation implemented by the low-level processing instructions prior to the modifying with a different collective communication operation; and implementing the modified graph-based representation of AI/ML workload execution in an emulated test case using an emulation engine.

9. The system of claim 8 wherein the low-level processing instructions comprise send and receive primitives.

10. The system of claim 9 wherein expanding the collective communication node comprises replacing the collective communication node with send and receive nodes.

11. The system of claim 10 wherein the test platform is configured for displaying a representation of the expanded collective communication node for a single rank.

12. The system of claim 8 wherein the emulated test case uses the different collective communication operation.

13. The system of claim 8 wherein the test platform is configured for reporting at least one performance metric from the executed emulated test case.

14. The system of claim 8 wherein the test platform is configured for comparing performance metrics from a first executed emulated test case using the low-level processing instructions based on the collective communication operation prior to the modifying and from a second executed emulated test case using the low-level processing instructions after the modifying.

15. A non-transitory computer readable medium having stored thereon executable instructions that when executed by at least one processor of at least one computer cause the at least one computer to perform steps comprising:

receiving a graph-based representation of AI/ML workload execution comprising a collective communication node;

expanding the collective communication node by replacing a collective communication operation of the collective communication node with low-level processing instructions;

generating a modified graph-based representation of AI/ML workload execution comprising the low-level processing instructions, wherein generating the modified graph-based representation of the AI/ML workload execution includes modifying the low-level processing instructions to replace a collective communication algorithm implemented by the low-level processing instructions prior to the modifying with a different collective communication algorithm; and implementing the modified graph-based representation of AI/ML workload execution in an emulated test case using an emulation engine.

16. The non-transitory computer readable medium of claim 15 wherein expanding the collective communication node comprises replacing the collective communication node with send and receive nodes.

* * * * *